(No Model.)
E. G. MILLER.
PICTURE FRAME.
No. 273,378. Patented Mar. 6, 1883.
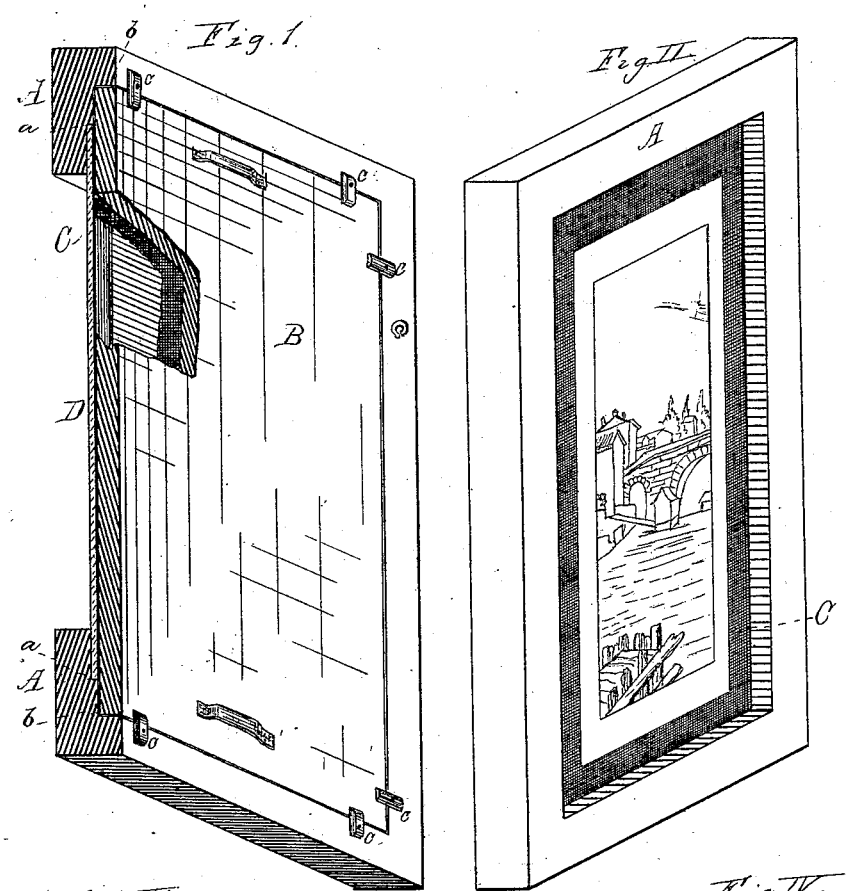
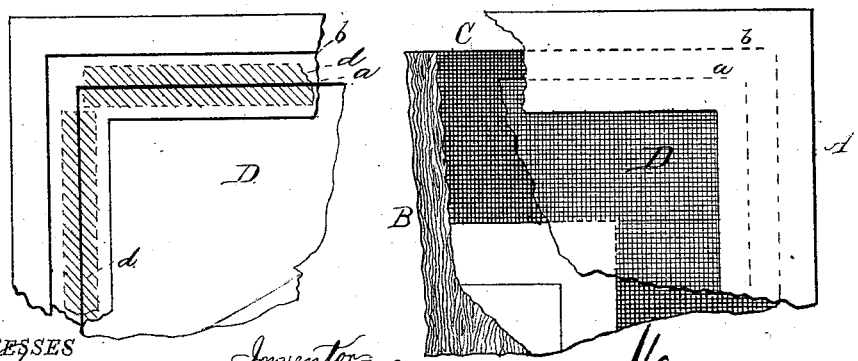

UNITED STATES PATENT OFFICE.

EDGAR G. MILLER, OF BALTIMORE COUNTY, MARYLAND.

PICTURE-FRAME.

SPECIFICATION forming part of Letters Patent No. 273,378, dated March 6, 1883.

Application filed November 27, 1882. (No model.)

*To all whom it may concern:*

Be it known that I, EDGAR G. MILLER, a citizen of the United States of America, residing in the county of Baltimore and State of Maryland, have invented certain new and useful Improvements in Picture-Frames; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in picture-frames, and its object is to provide a frame which can be utilized for displaying engravings, illustrations, cuts, or other representations of different sizes in a manner which will be pleasing to the eye and which will retain the picture or pictures in the frame securely and in any desired position, and which will readily allow the substitution of one engraving or other illustration for another with facility, and also to permit the use of two or more small pictures in one frame; and to this end my invention consists in providing a frame of ordinary external ornamentation or appearance and construction, with two circumferential grooves or recesses, the first or inner one being located near the inner front of the frame and adapted to receive the glass, so that the back of the glass will be flush or on a line with the outer recess or groove, the glass being secured to the frame, the other recess, which approaches the inner side of the outer edge of the frame, being for a removable back, which fits in the recess and fills the same, so as to be flush on the rear with the back of the picture-frame.

My invention also consists in providing a movable back for the frame with a covering on its inner side of textile or other material, which is of the same size as the glass and which has a pliable surface or nap—as plush or velvet—or with a covering of any other suitable material, with a padding or cushion of soft material behind it.

My invention also consists in providing the back of the frame with buttons or other means for holding the movable back in place, which buttons are either secured to the frame or to the movable back, and in the construction and combination as will be herein set forth and claimed.

In the annexed drawings, Figure 1 is a perspective sectional view in which are shown the recesses formed in the back of the frame. Fig. 2 is a perspective view of my improved picture-frame. Fig. 3 is a detailed view of the rear of the frame with the back removed; and Fig. 4 is a front view in detail, showing the different parts broken away.

A represents a picture-frame, which may be ornamented externally in any well-known manner, and it is provided on its rear with suitable recesses or grooves, as shown. The groove $a$, which extends around the picture-frame, is of a sufficient depth to accommodate the glass D, which may vary in thickness in frames of different sizes and qualities. This glass is secured within the groove $a$ by strips $d$, of thin material, muslin answering well, which are glued to the glass and frame adjacent to the recess formed therein for the reception of the glass. The glass may be otherwise secured in the recess, if desirable.

The movable back B of the frame fits snugly within the groove $b$, the lower portion of this groove being flush with the back of the glass, and it is secured against displacement by the buttons $c$ $c$, which are shown attached or pivoted to the frame.

It is evident that in cases where the groove $b$ is very near the outer edge of the back of the frame the buttons or other means for attaching the back may be secured to the back itself and turn in recesses or slots which will be formed in the raised portion of the frame.

The back B of the frame is preferably composed of wood or other rigid material, which is covered on the side which will be next the glass with a material having a pliable surface—as plush or velvet or other raised fabric which has a soft and elastic surface; or I may provide a covering of any other soft material, which may be cushioned or padded. This backing or mat C, which need only be the same size as the visible portion of the glass, is attached to the back B by being glued thereon; or, if desirable, it may be attached to the edges of the back by tacks. The object of this backing or mat C is twofold: first, it holds the picture in place in the frame by pressing the same against the glass; and, second, to present to the eye an ornamental margin around the picture when the same is smaller than the glass.

By means of a frame constructed as herein described independent mats and the inconvenience of arranging them within the frame is avoided, and a picture, however small, may be exhibited in an artistic and pleasing manner. The pictures may also be readily removed and changed, and several may be exhibited, if desirable, at the same time.

The frame hereinbefore described is particularly useful to picture-dealers, collectors of engravings, and to parties wishing to display fine advertisements. It may also be employed to display laces or other similar goods.

In some cases it may be desirable to exhibit pictures which are somewhat larger than the glass of the frame. This can be accomplished, as the frame will receive pictures of nearly the same size as the external edge of the frame, owing to the groove $b$ being flush with the glass and extending outwardly from it. It is evident in this case that the ornamental back will not be displayed, it being wholly covered by the picture.

In a frame of the character described the back can be readily removed, not only for the purpose of changing the pictures, but also for the purpose of cleaning the glass, which can readily be accomplished by removing the back, even when the frame proper is suspended.

It is evident that the frame, as herein described, can be cheaply and easily manufactured of such material as will suit the different uses to which it may be applied.

I am aware that prior to my invention frames have been made which have been provided with metallic springs to hold the picture in place, and that a picture-frame having its back held in place by buttons is not new, and I do not claim such invention; but

What I claim as new, and desire to secure by Letters Patent, is—

1. As a new article of manufacture, a rigid back for picture-frames, having secured thereto a covering of textile material, having a pile-surface, as velvet, so that said pliable surface will be adjacent to the glass of the picture-frame when inserted therein, substantially as described, and for the purposes set forth.

2. A picture-frame having a glass secured therein, in combination with a rigid removable back, covered on one side with a pliable and ornamental material arranged so that its pliable surface will be adjacent to the glass, substantially as described, and for the purposes set forth.

3. A picture-frame provided with a glass secured in a recess, and a recess for the reception of the back, which recess extends near the outer border of the frame, in combination with a removable back covered on one side with a pliable material, and means for attaching the same to the picture-frame, for the purpose set forth.

4. In a picture-frame provided with circumferential recesses and a glass, the combination of a movable back provided on the side adjacent to the glass with a covering of pliable material, and means for attaching the back to the picture-frame, whereby an illustration may be held within the frame, and provided with an ornamental margin, substantially as shown and described.

In testimony whereof I affix my signature in presence of two witnesses.

EDGAR G. MILLER.

Witnesses:
MURRAY HANSON,
JOS. WINKLER.